Aug. 21, 1951 G. KOCHEL, JR 2,564,699
AUTOMATIC DEBURRING ATTACHMENT
FOR SCREW MAKING MACHINES
Filed Oct. 3, 1947 2 Sheets-Sheet 1

INVENTOR.
George Kochel Jr.
BY
M. A. Hayes
Attorney

Aug. 21, 1951 G. KOCHEL, JR 2,564,699
AUTOMATIC DEBURRING ATTACHMENT
FOR SCREW MAKING MACHINES
Filed Oct. 3, 1947 2 Sheets—Sheet 2

INVENTOR.
George Kochel Jr.
BY
M.O.Hayes
Attorney

Patented Aug. 21, 1951

2,564,699

UNITED STATES PATENT OFFICE 2,564,699

AUTOMATIC DEBURRING ATTACHMENT
FOR SCREW MAKING MACHINES

George Kochel, Jr., San Diego, Calif.

Application October 3, 1947, Serial No. 777,839

7 Claims. (Cl. 10—5)

(Granted under the act of March 3, 1883, as
amended April 30, 1928; 370 O. G. 757)

This invention relates to automatic deburring attachments for a screw making machine.

One of the final operations in the fabrication of a screw by an automatic machine is the slotting of the screw head, which is usually accomplished by means of a circular saw. The slot thus formed generally has a number of burrs on the end, resulting from incomplete cutting by the saw blade. For many screw uses such burrs on the head are objectionable, and must be removed before fabrication of the screw can be regarded as complete.

It is an object of this invention to provide means for automatically deburring machine-fabricated screws.

It is another object of this invention to so improve an automatic screw-making machine that burrs on the screw may be automatically removed without lengthening the periodicity of the machine cycle.

It is a further object of this invention to provide simple means for altering and supplementing a standard screw-making machine, so that the finished screw is automatically deburred without decreasing in the slightest the time-productivity of the machine.

In general, the objects of this invention are effected by utilizing a relatively long period in the machine cycle when the otherwise completed screw is held in a bushing mounted on a pivoted arm. Instead of allowing the arm to lie dormant in the final phase of the fabrication cycle, just before the finished screw is ejected from the bushing, the arm is caused to pivot the bushing into alignment with a constantly rotating screw driver bit. The arm is then impelled toward the bit, bringing the blade of the bit into engagement with the slot in the head of the screw. The parts are retained in this engagement long enough to allow the bit to rotate one or two revolutions, thereby causing a sharp edged cutter, mounted on the bushing adjacent the surface to be deburred, to sever the burrs from the screw. The arm is then retracted and pivoted to its previous position, following which the screw is ejected from the bushing. The entire deburring operation takes place during a portion of the machine cycle when the arm would otherwise be dormant. In this way the deburring operation is automatically effected without lowering the time-productivity of the screw making machine.

One embodiment of the instant invention as applied to a particular type of automatic screw making machine will now be described with reference to the accompanying drawings, wherein.

For a clear understanding of the instant invention, presently known or conventional machinery will first be described in operation without the attachment of the instant invention. The instant invention will then be described, correlating its application to the conventional machine.

Conventional machine

Figure 1:
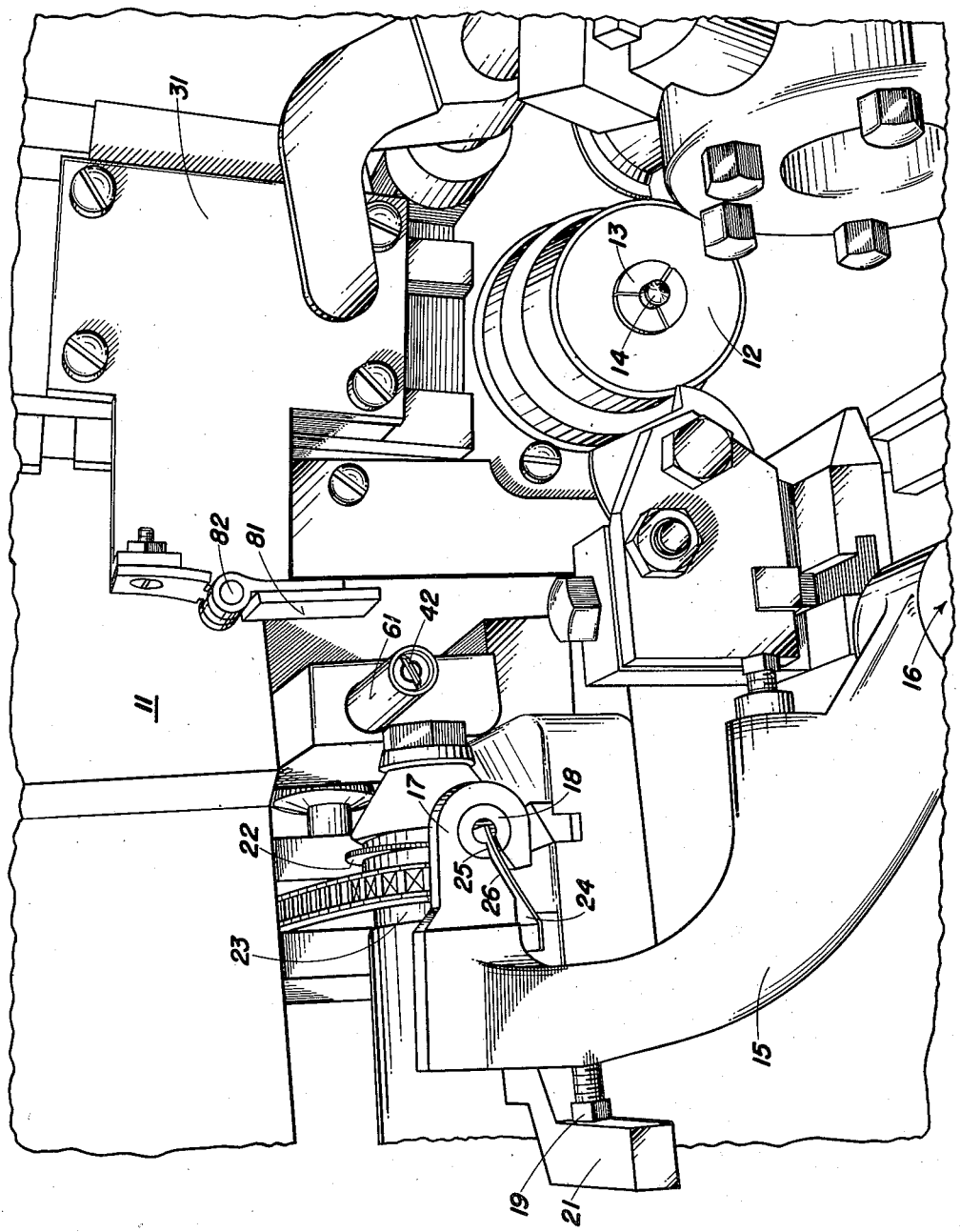
Fig. 1 is a perspective view of the output end of a screw making machine showing the application thereto of the deburring attachment constituting the instant invention.

In Fig. 1 there is shown the output end of an automatic screw machine 11. A stock bushing 12 holds and operates a collet 13 which holds the stock 14.

A screw receiving arm 15 is pivotally mounted on a shaft 16 (not specifically shown). The arm 15 is also slidable axially on the shaft 16, both the pivoting and the sliding thereof being controlled by cam means in conventional fashion. On the end of the arm 15 an offset portion 17 serves to hold a split bushing 18, the axis of which is parallel to the shaft 16.

When the arm 15 is rotated clockwise in Fig. 1, the bushing 18 is in position to receive a substantially completed screw from the stock bushing 12. The arm 15 is then returned to its substantially upright position, where the set screw 19 mounted thereon abuts a stop 21 as shown in Fig. 1. In this position, the head of the screw in bushing 18 (facing away from the observer in Fig. 1) is aligned with a circular saw 22 mounted on a horizontal, constantly rotating shaft 23. Through the cam means mentioned hereinbefore the arm 15 is slid forward on the shaft 16 to bring the head of the screw into engagement with the spinning saw 22, which cuts a conventional slot in the head thereof. The arm 15 remains in this position for an appreciable period of time while the rest of the machine 11 goes through certain of its screw forming steps.

At the appointed time in the cycle, the arm 15 is drawn back on the shaft 16, causing an ejector plate 24 fixedly mounted on the machine frame to enter into the bushing 18 through a radial split 25, and push from the bushing the completed screw, which drops into a receiving basket below. It will be noted that a slot 26 is formed in the offset portion 17 registering with the split 25 in bushing 18, to permit penetration of the ejector plate 24 into the center of the bushing.

Operation of the conventional machine

A complete cycle of the conventional machine will now be described, insofar as it relates to the slot cutting and ejecting operation pertinent to this specification. At a given point in the cycle, the arm 15 rotates clockwise on the shaft 16 to bring the bushing 18 into line with the stock 14 which is being formed into a screw. A vertically reciprocating tool head 31 then comes down to perform its operation on the stock 14. Following the operation of head 31, the arm 15 moves an unslotted screw, formed from the stock 14, forward so that it enters into the bushing 18 and is severed from the rest of the stock.

The arm 15 then rotates counter-clockwise until the adjustable screw 19 abuts the stop member 21. Next, arm 15 advances, sliding on the shaft 16, until a slot of proper depth has been cut in the screw head by the spinning saw 22. Arm 15 remains in this position while other portions of the machine cycle are effected. The arm 15 then withdraws from the saw 22, causing the ejector plate 24 to penetrate the bushing 18 and push the screw therefrom. The screw drops into a receiving basket below. At approximately this point in the cycle the tool head 31 is raised, and the arm 15 is ready to pivot clockwise to pick up another screw from the collet 13. The split 25 enables the arm to pivot directly down without first moving forward to pass the ejector 24 from the bushing 18.

When the screws being made are of the flathead type, the saw slotting operation leaves a burr on the under, beveled edge of the screw head. The manner in which the attachment constituting the instant invention removes these burrs will now be described.

The instant invention

Figure 3:
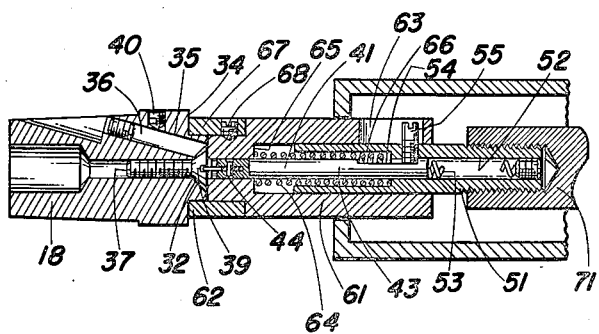
Fig. 3 is a top longitudinal cross-section through the screw driving member and the bushing which holds the screw to be deburred.
Figure 4:
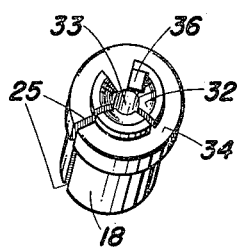
Fig. 4 is a perspective view of the screw holding bushing modified by the mounting of the sharp edged, burr-removing cutter.

Referring to Figs. 3 and 4, the split bushing 18 is shown having around its bore 33 a conical countersink 32 which receives the beveled, underface of a flathead screw 37. An annular groove 34 is formed around the outer edge of the bushing 18. In accordance with the instant invention, an oblique bore 35 is formed in the bushing 18 communicating with the conical countersink 32. This bore is substantially square in cross section, and receives a square cylindrical cutter 36, the sharp edged cutting blade of which rests substantially flush with the countersink 32. Cutter 36 is held in bore 35 by a set screw 40.

From the description thus far, it will be seen that a flathead screw 37, when rotated within the bushing 18 with its head 38 pressed against the countersink 32, will have any burrs formed around the slot 39 removed by the cutter 36.

The means for rotating the screw 37 takes the form of a constantly rotating screw driver bit 41 comprising a flat blade 42 mounted in the slotted end of a shank 43 by means of a transverse pin 44. Bit 41 is mounted, with its axis parallel to the shaft 16, the same distance away from the shaft as is the cutting region of the saw 22, as best seen in Fig. 1. Thus the arm 15, when rotated clockwise slightly from its position shown in Fig. 1, is enabled to bring the bushing 18 into line with the bit 41. The only step then remaining is the axial advancing of the arm 15 to bring the blade 42 into engagement with the slot 39 of the screw 37. This operation is effected by proper redesign of the cams which control the movement of arm 15 on shaft 16.

Since the rotation of the bit 41 is not phased with the advancing of arm 15, the blade 42 will, as a rule, not enter the slot 39 until the bit has rotated a few degrees. To accommodate such random entrance of the blade into the slot, it is advisable to mount the bit 41 with axial resiliency on its driving shaft 51. This is accomplished by providing the shaft 51 with a bore 52 in which the shank 43 is axially slidable, being pressed outwardly by a spring 53. The limits of axial movement of the shank 43 within the shaft 51 are determined by the extremes of a flat 54 formed on the shank which engages a set screw 55 radially mounted in the shaft 51.

Figure 2:
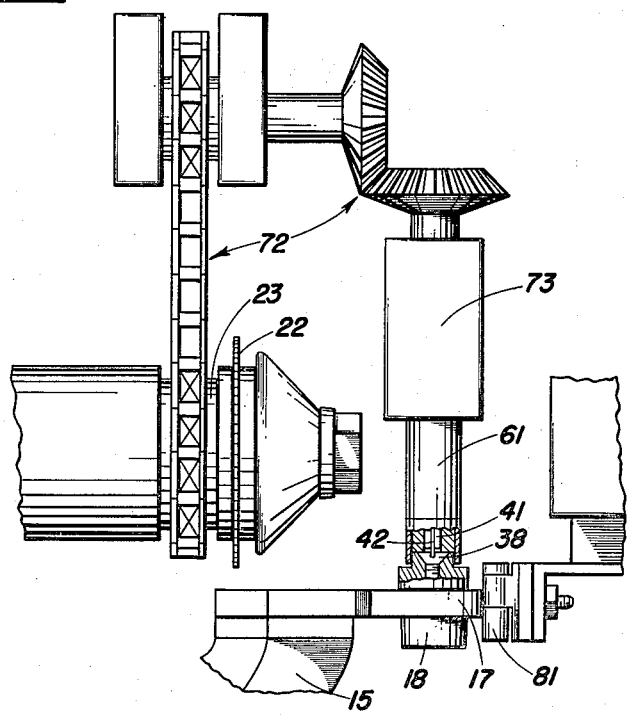
Fig. 2 is a top view showing the screw driver bit in engagement with a screw being deburred.

To facilitate centering of the bit 41 with the bushing 18 upon engagement of the two pieces, a sleeve 61 is slidably mounted around the bit. The outer edge 62 of the sleeve 61 is adapted to seat itself in the groove 34 as the bushing 18 is advanced to deburring position. Rotation of the sleeve 61 on the shaft 51 is restrained by the set screw 55, while axial movement is permitted by reciprocation of the set screw 55 in a longitudinal slot 63 formed in the sleeve 61. The sleeve 61 is biased outwardly of the bit 41 by a spring 64 compressed between an internal shoulder 65 on the sleeve 61 and the bottom of a recess 66 formed in the shaft 51. In fabrication it is preferred to form the sleeve 61 in two pieces, the forward end thereof comprising a ring 67 attached to the sleeve proper by a set screw 68. Driving means for the shaft 51 takes the form of a second shaft 71 into which the shaft 51 is threaded, as seen in Fig. 3. The shaft 71 is driven through a chain and gear arrangement 72 and suitable reduction gears 73 from the driving shaft 23 of the circular saw 22 (Fig. 2).

In practice it is not advisable to rely on cam means alone to position the arm 15. Accordingly there is mounted on the tool head 31 a stop member 81, against which the offset portion 17 of the arm 15 abuts when the arm is in deburring position as shown in Fig. 2. Since the cross head 31 is in lowered position when the arm 15 is to be pivoted counter-clockwise from the collet 13, it is necessary to mount the stop member 81 on a hinge 82, so that it may be pushed aside as the arm 15 brings the bushing counter-clockwise into slot-cutting position. When the screw 37 has been ejected from the bushing and the arm 15 is ready to rotate down to the stock bushing 12, the tool head 31 has been elevated so that the stop 81 is no longer in the way.

Operation of the instant invention

The instant invention does not come into play until that portion of the machine cycle immediately following the cutting of the slot by the saw 22. The cam means controlling the arm 15 are so recut that, at this point, instead of remaining dormant until time for screw ejection, the arm 15 is first withdrawn from the saw 22 enough to disengage the screw 37, but not enough to cause the ejector plate 24 to penetrate the bushing 18. Arm 15 is then pivoted clockwise until the extreme end of its offset portion 17 abuts the stop 81. This brings the screw 37 held in the split bushing 18 into line with the blade 42 of the bit 41. The arm 15 is then advanced axially on shaft 16 until the forward edge 62 of the sleeve 61 engages the groove 34 on the bushing 18. This serves to center the bushing with respect to the rotating bit 41, thereby insuring steady deburring action. Advancement of the arm 15 also brings the head 38 of the screw 37 into abutment with the blade 42. The bit 41 is pressed back slightly against the spring 53 until rotation of blade 42 causes it to snap into the slot 39. Continued rotation of the bit 42 causes the screw 37 to rotate in the bushing 18, and effectuates, by means of the cutter 36, removal of burrs formed on the conical under-face of the screw 37.

A few revolutions of the bit 41 are sufficient to satisfactorily deburr the screw. The arm 15 is then retracted from the bit 41 and pivoted back into the position where bushing 18 is opposite the saw 22. One cycle of operation of the instant invention is thus completed, and there remains only the conventional ejection of the screw by the further retraction of the arm 15, which causes the ejector plate 24 to push the screw 37 out of the bushing 18 and into the basket below.

From the above description it will be seen that there have been described improvements in an automatic screw-making machine which enable the machine to turn out screws free of burrs around the slot, without lengthening the operation cycle of the machine. It will be understood that this invention may be made and utilized in any suitable fashion, size, or arrangement, depending upon the screw-making machine to which it is to be applied and upon the type of screw which is to be deburred; and that various modifications and changes may be made in the invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Deburring apparatus for screws comprising a bushing adapted to receive a screw to be deburred, a cutter mounted on said bushing in position to deburr the head of a screw held in said bushing, a driver blade engageable with the slot in the head of the screw, a rotary driving shaft, means connecting said blade and shaft for rotating said blade, axially resilient means engaging said blade and shaft urging said blade outwardly of said shaft, a centering sleeve mounted around said blade axially movable with respect thereto, and means biasing said sleeve outwardly of said blade into engagement with said bushing.

2. In screw fabricating machinery including a movably mounted arm, a bushing mounted on said arm adapted to receive a screw from a thread forming portion of the machinery, saw means for cutting a slot in the head of the screw held in said bushing, and means for bringing said arm into slot-cutting engagement with said saw means thereby to cut a slot in the screw head; the improvement which comprises: a cutter mounted in said bushing in position to bear against the head of the screw held in said bushing, a screw driver bit mounted for rotation about its axis, means for rotating said bit, means for moving said arm from said slot-cutting position to bring said bushing in line with said rotary bit, and means for moving said arm toward said rotary bit to bring said rotary bit into engagement with the slot in the screw head, thereby to turn the screw in said bushing and effect deburring by said cutter.

3. In screw fabricating machinery including a movably mounted arm, a bushing mounted on said arm adapted to receive a screw from a thread forming portion of the machinery, saw means for cutting a slot in the head of the screw held in said bushing, and means for bringing said arm into slot-cutting engagement with said saw means thereby to cut a slot in the screw head; the improvement which comprises: a cutter mounted in said bushing in position to bear against the head of the screw held in said bushing, a screw driver bit, a rotary shaft mounting said bit, resilient means coacting with said bit and said shaft biasing said bit outwardly of said shaft, means for rotating said rotary shaft and bit, and means for moving said arm from said slot cutting position to bring said rotary bit into engagement with the slot in the screw head, thereby to turn the screw in said bushing and effect deburring by said cutter.

4. In screw fabricating machinery including a movably mounted arm, a bushing mounted on said arm adapted to receive a screw from a thread forming portion of the machinery, saw means for cutting a slot in the head of the screw held in said bushing, and means for bringing said arm into slot-cutting engagement with said saw means thereby to cut a slot in the screw head; the improvement which comprises: an annular groove in said bushing, a cutter mounted in said bushing in position to bear against the head of the screw held in said bushing, a screw driver bit, a rotary shaft mounting said bit, resilient means coacting with said bit and said shaft biasing said bit outwardly of said shaft, a centering sleeve disposed around said bit adapted to engage said annular groove in said bushing, resilient means urging said sleeve outwardly of said bit, means for rotating said rotary shaft and bit, means for moving said arm toward said rotary bit to bring said centering sleeve into engagement with said annular groove and said rotary bit into engagement with the slot in the screw head, thereby to turn the screw in said bushing and effect deburring by said cutter.

5. In screw fabricating machinery including a pivotally mounted arm, a bushing mounted on said arm adapted to receive a screw from a thread forming portion of the machinery, saw means for cutting a slot in the head of the screw held in said bushing, and means for bringing said arm into slot-cutting engagement with said saw means thereby to cut a slot in the screw head; the improvement which comprises: a cutter mounted in said bushing in position to bear against the head of the screw held in said bushing, a screw driver bit mounted for rotation about its axis, means for rotating said bit, means for rotating said pivotally mounted arm to bring said bushing in line with said rotary bit, stop means positioned to engage said arm to insure exact alignment of said bushing and said rotary bit, and means for moving said arm toward said rotary bit to bring said bit into engagement with the slot in the screw head, thereby to turn the screw in said bushing and effect deburring by said cutter.

6. In screw fabricating machinery including a pivotally mounted arm, a bushing mounted on said arm adapted to receive a screw from a thread forming portion of the machinery, saw means for cutting a slot in the head of the screw held in said bushing, and means for bringing said arm into slot-cutting engagement with said saw means thereby to cut a slot in the screw head; the improvement which comprises: an annular groove in said bushing, a cutter mounted in said bushing in position to bear against the head of the screw held in said bushing, a screw driver bit, a rotary shaft mounting said bit, resilient means coacting with said bit and said shaft biasing said bit outwardly of said shaft, a centering sleeve disposed around said bit adapted to engage said annular groove in said bushing, resilient means urging said sleeve outwardly of said bit, means for rotating said rotary shaft and bit, means for rotating said pivotally mounted arm to bring said bushing in line with said rotary bit, stop means positioned to engage said arm to insure exact alignment of said bushing and said rotary bit, and means for moving said arm toward said rotary bit to bring said centering sleeve into engagement with said annular groove and said rotary bit into engagement with the slot in the screw head, thereby to turn the screw in said bushing and effect deburring by said cutter.

7. In screw fabricating machinery including a pivotally mounted arm, a bushing mounted on said arm adapted to receive a screw from a thread forming portion of the machinery, saw means for cutting a slot in the head of the screw held in said bushing, means for bringing said arm into slot-cutting engagement with said saw means thereby to cut a slot in the screw head, and an oscillating member movable toward and away from the axis about which said arm pivots; the improvement which comprises: an annular groove in said bushing, a cutter mounted in said bushing in position to bear against a screw held in said bushing, the head of a screw driver bit, a rotary shaft mounting said bit, resilient means coacting with said bit and said shaft biasing said bit outwardly of said shaft, a centering sleeve disposed around said bit adapted to engage said annular groove in said bushing, resilient means urging said sleeve outwardly of said bit, means for rotating said rotary shaft and bit, means for rotating said pivotally mounted arm to bring said bushing in line with said rotary bit, a hinged stop member mounted on said oscillating member in position to engage said arm to insure exact alignment of said bushing and said bit, and means for moving said arm toward said rotary bit to bring said centering sleeve into engagement with said annular groove and said rotary bit into engagement with the slot in the screw head, thereby to turn the screw in said bushing and effect deburring by said cutter.

GEORGE KOCHEL, JR.

REFERENCES CITED

The following references are of record in the file of this patent:

UNITED STATES PATENTS

| Number | Name | Date |
|---|---|---|
| 97,230 | Rodney | Nov. 23, 1869 |
| 314,935 | Harvey | Mar. 31, 1885 |
| 635,147 | Sandstron | Oct. 17, 1899 |
| 1,970,216 | Bechler | Aug. 14, 1934 |